United States Patent Office 3,475,463
Patented Oct. 28, 1969

3,475,463
15,16-UNSATURATED 19-NORSTEROIDS AND THEIR PREPARATION
Donald K. Phillips, North Greenbush, N.Y., assignor to Sterling Drug Inc., New York, N.Y., a corporation of Delaware
No Drawing. Filed July 11, 1966, Ser. No. 563,985
Int. Cl. C07c *169/10, 169/08;* A61k *27/00*
U.S. Cl. 260—397.4                             16 Claims

ABSTRACT OF THE DISCLOSURE 19-norsteroids having a double bond at the 15,16-position, further non-aromatic unsaturation in Ring A, an oxygen function at C–3, and a free or esterified hydroxy group at C–17 optionally accompanied by a hydrocarbon substituent, are prepared via alkali-metal-ammonia reduction of 15,16-dehydroestrone methyl ether. The compounds possess progestational, estrogenic and myotrophic properties.

This invention relates to novel 19-norsteroid compounds, and in particular is concerned with 19-norsteroids having a double bond at the 15,16-position, further non-aromatic unsaturation in Ring A, an oxygen function at C–3, and a free or esterified hydroxy group at C–17 optionally accompanied by a hydrocarbon substituent. The invention is also concerned with methods for the preparation of these compounds.

The compounds of the invention are represented by the following structural formulas:

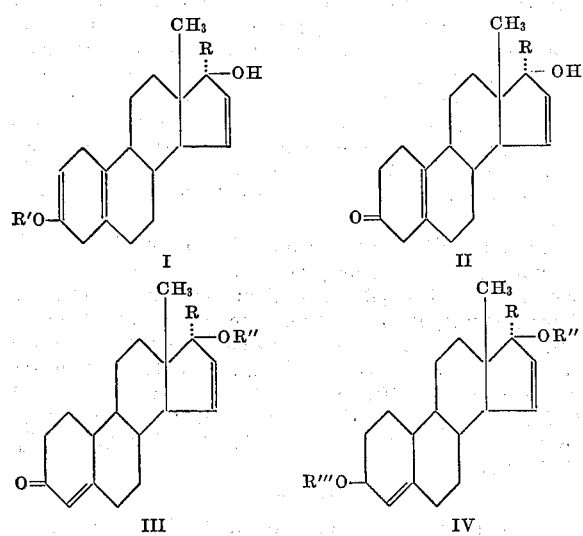

In the above formulas R stands for hydrogen, lower-alkyl, lower-alkenyl, lower-alkynyl or halo-lower-alkynyl. The substituent R when other than hydrogen preferably has from one to four carbon atoms and thus is illustrated by such groups as methyl, ethyl, propyl, isopropyl, butyl, vinyl, allyl, 2-butenyl, methallyl, ethynyl, 1-propynyl, 2-propynyl, 1-butynyl, chloroethynyl, bromoethynyl, 3-bromo-1-propynyl, 3-fluoro-1-propynyl, and the like.

In the above Formula I, R' stands for lower-alkyl. The lower-alkyl preferably has from one to six carbon atoms and thus includes methyl, ethyl, propyl, isopropyl, butyl, hexyl, and the like.

In the above Formulas III and IV, R″ and R‴ stand for hydrogen or carboxylic acyl having from one to twelve carbon atoms. The acyl groups preferably have molecular weights less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has 5–6 ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl and N,N-di-lower-alkylcarbamyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, for example p-tolyl; lower 1-alkoxy, for example 3,4-dimethoxyphenyl; halogen (including fluorine, chlorine, bromine and iodine), for example 2-bromophenyl; and nitro, for example p-nitrophenyl. The lower-alkyl and lower-alkoxy groups preferably have from one to four carbon atoms.

The starting material for the preparation of the compounds of the invention is a 3-lower-alkyl ether of 1,3,5-(10),15-estratetraen-3-ol-17-one (15-dehydroestrone lower-alkyl ether). Two routes of synthesis may be employed:

(1) The 15-dehydroestrone lower-alkyl ether is reacted with a Grignard reagent RMgX, an organolithium compound RLi, or the equivalent thereof, and the resulting 17α-R-3-R′O - 1,3,5(10),15 - estratetraen-17β-ol reduced with an alkali metal, preferably lithium, in liquid ammonia in the presence of a lower-alkanol to give a compound of Formula I.

(2) The 15-dehydroestrone lower-alkyl ether is reduced with lithium aluminum hydride to 3-R′O-1,3,5-(10),15-estratetraen-17β-ol, which is then reduced with an alkali metal, preferably lithium, in liquid ammonia to give a compound of Formula I where R is hydrogen. The latter can be oxidized, as with aluminum isopropoxide or tertiary-butoxide, or chromic oxide, to give the useful intermediate, 3-lower-alkoxy-2,5(10),15-estratrien-17-one. This intermediate is then reacted with a Grignard reagent, RMg-halide, an organolithium compound RLi, or the equivalent thereof, to give a compound of Formula I where R is a hydrocarbon substituent.

Method (1) is preferred when it is desired to prepare compounds of Formula I where R is lower-alkyl. Method (2) is preferred when it is desired to prepare compounds of Formula I where R is lower-alkenyl, lower-alkenyl or halo-lower-alkynyl.

Mild acid treatment of a compound of Formula I cleaves the enol ether and transforms it into a 3-oxo-$\Delta^{5(10)}$ compound of Formula II. Any mild acid can be used, oxalic acid being a preferred acid.

The compounds of Formula II are isomerized to the corresponding compounds of Formula III in the presence of a strong base or a strong acid. Accordingly, if a compound of Formula I is treated with a strong acid such as hydrochloric acid, it is converted directly to a compound of Formula III. However, strong acids will often cause side reactions involving rearrangement of the C–17 substituents and are preferably avoided.

The compounds of Formula IV are prepared by reduction of the corresponding compounds of Formula III with a metal hydride such as lithium aluminum hydride, lithium tri-t-butoxy-aluminum hydride, sodium borohydride, and the like.

The compounds of Formulas III and IV where R″ is carboxylic acyl are prepared by conventional esterification reactions employing the appropriate acid anhydride or acid halide.

The structures of the compounds of the invention were established by the modes of synthesis, by elementary analysis and by ultraviolet, infrared and NMR spectra.

Endocrinological evaluation of the compounds of the invention has shown that they possess progestational, estrogenic and myotrophic properties, thus indicating their usefulness as fertility regulating agents and growth promoting agents. They are effective in doses of 0.5–30 mg./kg. and can be prepared for use in the manner employed for other physiologically active steroidal substances.

The following examples will further illustrate the invention without the latter being limited thereby.

Example 1

(a) 3-methoxy-17α-methyl - 1,3,5(10),15 - estratetraen-17β-ol.—A solution of 2.50 g. of 3-methoxy-1,3,5(10),15-estratetraen-17-one (15-dehydroestrone methyl ether) in 50 ml. of tetrahydrofuran (distilled from calcium hydride) was added over a period of 10 minutes to 50 ml. of methyllithium in ether (1.26–1.64 millimoles per ml.) with stirring. The reaction mixture was stirred for 10 minutes, water added, and the mixture extracted with an ether-benzene mixture. The extracts were washed with water and saturated sodium chloride, filtered through anhydrous sodium sulfate and concentrated in vacuo. The residue was recrystallized twice from methanol to give 3-methovy-17α-methyl-1,3,5(10),15-estratetraen-17β-ol, colorless flakes, M.P. 108.6–109.6° C. (corr.); $[\alpha]_D^{25} = -65.3°$ (1% in chloroform).

By replacing the methyllithium in the foregoing preparation by a molar equivalent amount of n-butyllithium, there can be prepared 3-methoxy-17α-(n-butyl)-1,3,5(10),15-estratetraen-17β-ol.

(b) 3-methoxy-17α-methyl - 2,5(10),15 - estratrien-17β-ol [I; R and R' are $CH_3$].—To a solution of 4.15 g. of 3-methoxy-17α-methyl-1,3,5(10),15 - estratetraen - 17β-ol in 200 ml. of liquid ammonia and 80 ml. of tetrahydrofuran at −75° C. was added 3.0 g. of lithium wire. After a few minutes of stirring the mixture turned blue, and 40 ml. of absolute ethanol was added over a period of 10 minutes, then an additional 40 ml. of ethanol was added over a period of 5 minutes. Solid ammonium chloride was added until the blue color disappeared, then methanol was added and the mixture stirred at −75° C. for 90 minutes. The reaction mixture was warmed to room temperature, diluted with water and extracted with ether. The ether extracts were washed with saturated sodium chloride, filtered through anhydrous sodium sulfate and concentrated in vacuo. The residue, 3.90 g., M.P. 130–139° C. was recrystallized from a benzene-methanol mixture to give 3-methoxy-17α-methyl-2,5(10),15-estratrien-17β-ol, colorless flakes, M.P. 148.0–153.0° C. (corr.); $[\alpha]_D^{25} = -9.8°$ (1% in chloroform).

3-methoxy-17α-(n-butyl) - 1,3,5(10),15 - estratetraen-17β-ol can be similarly reduced to 3-methoxy-17α-(n-butyl-2,5(10),15-estratrien-17β-ol [I; R is $C_4H_9$, R' is $CH_3$].

Example 2

(a) 3-methoxy-1,3,5(10),15 - estratetraen - 17β - ol.—To a stirred solution of 5.00 g. of 3-methoxy-1,3,5(10),15-estratetraen-17-one (15-dehydroestrone methyl ether) in 50 ml. of tetrahydrofuran and 100 ml. of anhydrous ether cooled in ice was added 2.50 g. of lithium aluminum hydride. The reaction mixture was stirred one hour at 0° C. and allowed to stand at room temperature for 40 hours. The mixture was cooled in ice, ethyl acetate added to destroy excess lithium aluminum hydride and saturated sodium sulfate solution added until the salts had coagulated. Solid anhydrous sodium sulfate was added, and after 15 minutes the ether layer was decanted, the solid washed with ether, and the combined organic solutions washed with saturated sodium chloride solution, filtered through anhydrous sodium sulfate and concentrated in vacuo. There was thus obtained 3-methoxy-1,3,5(10),15-estratetraen-17β-ol, colorless rods, M.P. 152.6–157.2° C. (corr.) when recrystallized from a benzene-methanol mixture; $[\alpha]_D^{25} = +1.5°$ (1% in chloroform).

(b) 3-methoxy-2,5(10),15-estratrien-17β-ol [I; R is H, R' is $CH_3$] was prepared by reduction of 3-methoxy-1,3,5(10),15-estratetraen-17β-ol with lithium in liquid ammonia according to the procedure described above in Example 1, part (b), and had the M.P. 138–140.5° C. (uncorr.) when recrystallized from a benzene-methanol mixture.

Example 3

(a) 3-methoxy-2,5,(10),15-estratrien-17-one.—A solution of 13.00 g. of 3-methoxy-2,5(10),15-estratrien-17β-ol and 3 drops of pyridine in 800 ml. of benzene was distilled in a nitrogen atmosphere until 50 ml. of solvent had distilled off. The solution was cooled to room temperature, and 300 ml. of acetone was added, followed by 23.0 g. of aluminum isopropoxide. The reaction mixture was stirred for two days under nitrogen at room temperature, then diluted with ether, washed with saturated sodium potassium tartrate solution and saturated sodium chloride solution, filtered through anhydrous sodium sulfate and concentrated in vacuo. The residue was recrystallized twice from ethyl acetate to give 3-methoxy - 2,5(10),15-estratrien-17-one, colorless rods, M.P. 192–197° C. (vac.) (uncorr.).

(b) 3-methoxy - 17α - ethynyl - 2,5(10),15 - estratrien-17β-ol [I; R is C≡CH, R' is $CH_3$].—Tetrahydrofuran (400 ml.) was saturated with acetylene and cooled in ice. A solution of 125 ml. of n-butyllithium (1.6 molar in hexane) in 100 ml. of tetrahydrofuran was added over a period of 10 minutes. The ice bath was removed and the reaction mixture stirred under an acetylene atmosphere for 45 minutes. The mixture was cooled in ice, and a solution of 16.26 g. of 3-methoxy-2,5(10),15 - estratrien-17-one in 175 ml. of tetrahydrofuran was added over a period of 15 minutes. The reaction mixture was stirred under an acetylene atmosphere for 15 minutes at 0° C., then sodium sulfate was added followed by ether and benzene. The organic solution was washed with saturated sodium chloride solution, filtered through anhydrous sodium sulfate and concentrated in vacuo. The residue was recrystallized from methanol and a benzene-methanol mixture to give 9.63 g. of 3 - methoxy - 17α - ethynyl-2,5(10),15 - estratriene-17β-ol, M.P. 169–173° C. (vac.) (uncorr.).

By eliminating the acetylene and replacing the n-butyllithium in the foregoing preparation by a molar equivalent amount of vinyllithium, allylmagnesium bromide or 1-propynylmagnesium bromide, there can be obtained, respectively, 3 - methoxy - 17α - vinyl - 2,5(10),15-estratrien - 17β - ol [I; R is CH=$CH_2$, R' is $CH_3$], 3-methoxy-17α - allyl - 2,5(10),15 - estratrien - 17β - ol [I; R is $CH_2$CH=$CH_2$, R' is $CH_3$], or 3 methoxy-17α-(1-propynyl) - 2,5(10),15 - estratrien-17β-ol [I; R is C≡$CCH_3$, R' is $CH_3$].

Example 4

3 - methoxy - 17α - chloroethynyl - 2,5(10),15 - estratrien - 17β - ol [I; R is C≡CCl, R' is $CH_3$].—A solution of 42 ml. of cis-1,2-dichloroethylene in 280 ml. of ether was added to a stirred solution of 200 ml. of 1.7 N methyllithium in ether cooled in an ice bath. The mixture was stirred for 10 minutes, then a solution of 14.0 g. of 3-methoxy-2,5(10),15-estratrien-17-one in 250 ml. of tetrahydrofuran was added. The reaction mixture was stirred for 30 minutes, then added to 500 ml. of distilled water and shaken with 250 ml. of benzene and 250 ml. of ether. The organic layer was washed with saturated sodium chloride solution and filtered through anhydrous sodium sulfate. The filtrate was treated with several drops of pyridine, allowed to stand for about sixteen hours and then concentrated in vacuo. The residue containing 3-methoxy - 17α - chloroethynyl - 2,5(10),15 - estratrien-17β-ol was used directly in Example 7 below.

Example 5

17α - methyl - 5(10),15 - estradien - 17β - ol - 3 - one [II; R is CH₃].—A mixture of 2.95 g. of 3 - methoxy-17α-methyl - 2,5(10),15 - estratrien-17β-ol (Example 1(b)), 50 ml. of acetone and 2 ml. of water containing a few crystals of p-toluenesulfonic acid was stirred under nitrogen for five hours, then poured into 400 ml. of dilute potassium bicarbonate solution and extracted with ethyl acetate. The extracts were washed with saturated sodium chloride solution, filtered through anhydrous sodium sulfate and concentrated in vacuo. The residue was recrystallized from acetonitrile to give 17α - methyl - 5(10),15-estradien - 17β - ol - 3 - one, pale yellow crystals, M.P. 134.8–140.0° C. (corr.); $[\alpha]_D^{25} = +47.9°$ (1% in chloroform).

Example 6

17α - ethynyl - 5(10),15 - estradien - 17β - ol - 3 - one [II; R is C≡CH].—To a solution of 8.00 g. of 3-methoxy-17α-ethynyl-2,5(10),15-estratrien-17β-ol (Example 3 (b)) in 75 ml. of tetrahydrofuran and 75 ml. of methanol was added a solution of 6.0 g. of oxalic acid dihydrate in 25 ml. of water. The reaction mixture was stirred one hour at room temperature, then poured into cold aqueous potassium bicarbonate and extracted with ether and benzene. The extracts were washed with saturated sodium chloride solution, filtered through anhydrous sodium sulfate and concentrated in vacuo. The residue was recrystallized from a benzene-isopropyl alcohol mixture to give 6.77 g. of product, M.P. 165–170° C. (vac.) (uncorr.). The latter was dissolved in benzene and chromatographed on 400 g. of silica gel prewet with benzene. The column was eluted with ether in benzene and with ether alone, and the product thus brought out was recrystallized from a benzene-isopropyl alcohol mixture to give 17α-ethynyl-5(10),15-estradien-17β-ol-3-one, pale tan crystals, M.P. 171–173° C. (uncorr.); $[\alpha]_D^{25} = -70.2°$ (1% in chloroform).

Similarly, 3 - methoxy - 2,5(10),15 - estratrien - 17β-ol, 3 - methoxy - 17α - vinyl - 2,5(10),15 - estratrien - 17β-ol, 3 - methoxy - 17α - allyl - 2,5(10),15 - estratrien-17β-ol, or 3 - methoxy - 17α - (1-propynyl) - 2,5(10),15 - estratrien - 17β - ol can be hydrolyzed, respectively, to 5(10), 15 - estradien - 17β - ol - 3 - one [II; R is H], 17α-vinyl-5(10),15 - estradien - 17β - ol-3-one [II; R is CH=CH₂], 17α - allyl - 5(10),15 - estradien - 17β - ol - 3 - one [II; R is CH₂CH=CH₂], or 17α - (1 - propynyl) - 5(10),15-estradien - 17β - ol - 3 - one [II; R is C≡CCH₃].

Example 7

17α - chloroethynyl - 5(10),15 - estradien - 17β - ol-3-one [II; R is C≡CCl] was prepared by oxalic acid hydrolysis of 3 - methoxy - 17α - chloroethynyl - 2,5(10), 15-estratrien-17β-ol (Example 4) according to the procedure of Example 6. The product was recrystallized from ether to give 17α - chloroethynyl - 5(10),15 - estradien-17β-ol-3-one, colorless needles, M.P. 145.0–145.4° C. (corr.); $[\alpha]_D^{25} = -101.9°$ (1% in chloroform).

Example 8

17α - methyl - 4,15 - estradien - 17β - ol - 3 - one [III; R is CH₃, R″ is H].—A mixture of 15.00 g. of 17α-methyl -5(10),15-estradien-17β-ol-3-one (Example 5), 50 ml. of tetrahydrofuran, 50 ml. of methanol and 3 drops of 35% aqueous sodium hydroxide was stirred at room temperature under nitrogen for 75 minutes. The reaction mixture was poured into cold water containing excess acetic acid and extracted with ether, benzene and ethyl acetate. The combined extracts were washed with saturated sodium chloride solution, filtered through anhydrous sodium sulfate and concentrated in vacuo. The residue was recrystallized from a methylene dichloride-ether mixture to give 13.94 g. of product, M.P. 163–166° C. (uncorr.). Further recrystallization provided a sample of 17α - methyl - 4,15 - estradien - 17β - ol - 3 - one, colorless rods, M.P. 170–172.0° C. (corr.);

$[\alpha]_D^{25} = -40.0°$ (1% in chloroform).

Similarly, 5(10),15-estradien-17β-ol-3-one, 71α-vinyl-5(10),15-estradien-17β-ol-3-one, 17α-allyl-5(10),15-estradien-17β-ol-3-one, or 17α-(1-propynyl)-5(10),15-estradien-17β-ol-3-one can be isomerized, respectively, to 4,15-estradien-17β-ol-3-one [III; R and R″ are H], 17α-vinyl-4,15-estradien-17β-ol-3-one [III; R is CH=CH₂, R″ is H], 17α-allyl-4,15-estradien-17β-ol-3-one [III; R is CH₂CH=CH₂, R″ is H], or 17α-(1-propynyl)-4,15-estradien-17β-ol-3-one [III; R is C≡CCH₃, R″ is H].

Example 9

17α-ethynyl-4,15-estradien-17β-ol-3-one [III; R is C≡CH, R″ is H] was prepared by basic isomerization of 17α-ethynyl-5(10),15-estradien-17β-ol-3-one (Example 6) according to the procedure described in Example 8. The product was recrystallized from an acetone-benzene mixture to give 17α-ethynyl-4,15-estradien-17β-ol-3-one, M.P. 188.0–189.8° C. (corr.); $[\alpha]_D^{25} = -172.7°$ (1% in chloroform).

17α-ethynyl-4,15-estradien-17β-ol-3-one when heated with acetic anhydride in pyridine solution is converted to 17β-acetoxy-17α-ethynyl-4,15-estradien-3-one [III; R is C≡CH, R″ is COCH₃].

Example 10

17α-chloroethynyl-4,15-estradien-17β-ol-3-one [III; R is C≡CCl, R″ is H] was prepared by basic isomerization of 17α - chloroethynyl - 5(10),15 - estradien-17β-ol-3-one (Example 7) according to the procedure described in Example 8. The product was recrystallized from a benzene-hexane mixture to give 17α-chloroethynyl-4,15-estradien-17β-ol-3-one, M.P. 157.2–159.6° C. (corr.), colorless microprisms, M.P. 157.2–159.6° C.; (corr.) $[\alpha]_D^{25} = -203.7°$ (1% in chloroform).

Example 11

(a) 17α-methyl-4,15-estradiene-3β,17β-diol [IV; R is CH₃, R″ and R‴ are H].—To a solution of 2.00 g. of 17α-methyl-4,15-estradien-17β-ol-3-one (Example 8) in 50 ml. of tetrahydrofuran was added 4.42 g. of lithium tri-t-butoxyaluminum hydride. The reaction mixture was stirred 140 minutes, then poured into 400 ml. of cold water containing excess acetic acid, and extracted with ether and benzene. The extracts were washed with water, saturated sodium chloride solution, filtered through anhydrous sodium sulfate and concentrated in vacuo, leaving a residue containing 17α-methyl-4,15-estradiene-3β,17β-diol.

Similarly, 4,15-estradien-17β-ol-3-one, 17α-vinyl-4,15-estradien-17β-ol-3-one, 17α-allyl-4,15-estradien-17β-ol-3-one, or 17α-(1-propynyl)-4,15-estradien-17β-ol-3-one can be reduced, respectively, to 4,15-estradiene-3β,17β-diol [IV; R, R″ and R‴ are H], 17α-vinyl-4,15-estradiene-3β,17β-diol [IV; R is CH=CH₂, R″ and R‴ are H], 17α-allyl-4,15-estradiene-3β,17β-diol [IV; R is CH₂CH=CH₂, R″ and R‴ are H], or 17α-(1-propynyl)-4,15-estradiene-3β,17β-diol [IV; R is C≡CCH₃, R″ and R‴ are H].

(b) 3β-acetoxy-17α-methyl-4,15-estradien-17β-ol [IV; R is CH₃, R″ is H, R‴ is CH₃CO].—To a solution of 9.52 g. of 17α-methyl-4,15-estradiene-3β,17β-diol in 25 ml. of pyridine cooled in ice was added 15 ml. of acetic anhydride. The mixture was kept five hours at room temperature, then poured into 250 ml. of cold water and extracted with ether and benzene. The extracts were washed with saturated sodium chloride solution, filtered through anhydrous sodium sulfate and concentrated in vacuo. The residue was dissolved in benzene and chromatographed on 170 g. of silica gel. The column was eluted with ether in pentane. Eluants containing 12.5–15% ether brought out the desired product which was recrystallized from acetonitrile and from ether-pentane to give 3β-acetoxy- 17α-methyl-4,15-estradien-17β-ol, M.P. 97.0–99.4° C. (corr.); [α]$_D^{25}$ = –107.8° (1% in chloroform).

17α-methyl-4,15-estradiene-3β,17β-diol can be similarly acylated with caproyl chloride, β-cyclohexylpropionyl chloride, p-nitrobenzoyl chloride, β-phenylpropionyl chloride, cinnamoyl chloride, p-chlorophenoxyacetyl chloride, or nicotinoyl chloride to give, respectively, 3β-caproyloxy-17α-methyl-4,15-estradien-17β-ol, 3β-(β-cyclohexylpropionoxy)-17α-methyl-4,15-estradien-17β-ol, 3β - (p-nitrobenzoyloxy) - 17α - methyl-4,15-estradien-17β-ol, 3β-(β-phenylpropionoxy)-17α-methyl-4,15-estradien-17β-ol, 3β-cinnamoyloxy - 17α-methyl-4,15-estradien-17β-ol, 3β-(p-chlorophenoxyacetoxy) - 17α-methyl-4,15-estradien-17β-ol, or 3β-nicotinoyloxy-17α-methyl-4,15-estradien-17β-ol.

If the acylation mixture of Example 11(b) is heated esterification at C–17 also occurs to form 3β,17β-diacetoxy-17α-methyl-4,15-estradiene [IV; R is CH$_3$, R" is COCH$_3$, R'" is CH$_3$CO]. The latter when subjected to mild hydrolysis, as with potassium carbonate in methanol, is converted to 17β-acetoxy-17α-methyl-4,15-estradien-3β-ol [IV; R is CH$_3$, R" is COCH$_3$, R'" is H].

Example 12

17α-ethynyl-4,15-estradiene-3β,17β-diol [IV; R is C≡CH, R" and R'" are H] and its 3-acetate [IV; R is C≡CH, R" is H, R'" is CH$_3$CO] were prepared by reduction and acetylation of 17α-ethynyl-4,15-estradiene-17β-ol-3-one (Example 9) according to the procedures described in Example 11. The acetylated product was recrystallized from absolute ether to give 3β-acetoxy-17α-ethynyl-4,15-estradien-17β-ol, colorless prisms, M.P. 153–155° C. (uncorr.); [α]$_D^{25}$ = –192.1° (1% in chloroform).

I claim:

1. A compound of the formula

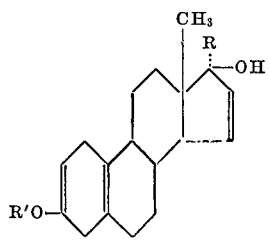

wherein R is hydrogen, lower-alkyl, lower-alkenyl, lower-alkynyl or halo-lower-alkynyl, and R' is lower-alkyl.

2. 3 - methoxy-17α-methyl-2,5(10),15-estratrien-17β-ol, according to claim 1, wherein R and R' are methyl.

3. 3 - methoxy-2,5(10),15-estratrien-17β-ol, according to claim 1, wherein R is hydrogen and R' is methyl.

4. 3-lower-alkoxy-2,5(10),15-estratrien-17-one.

5. 3 - methoxy-2,5(10),15-estratrien-17-one, according to claim 4, wherein lower-alkoxy is methoxy.

6. A compound of the formula

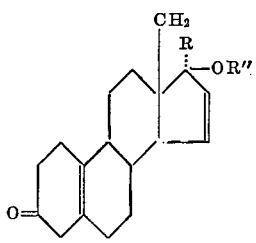

wherein R is hydrogen, lower-alkyl, lower-alkenyl, lower-alkynyl or halo-lower-alkynyl, and R" is hydrogen or carboxylic acyl having from one to twelve carbon atoms.

7. 17α - methyl-5(10),15-estradien-17β-ol-3-one, according to claim 6, wherein R is methyl and R" is hydrogen.

8. 17α-ethynyl-5(10),15-estradien-17β-ol - 3 - one, according to claim 6, wherein R is ethynyl and R" is hydrogen.

9. 17α - (2-chloroethynyl)-5(10),15-estradien-17β-ol-3-one, according to claim 6, wherein R is chloroethynyl and R" is hydrogen.

10. A compound of the formula

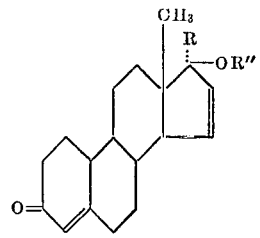

wherein R is hydrogen, lower-alkyl, lower-alkenyl, lower-alkynyl or halo-lower-alkynyl, and R" is hydrogen or carboxylic acyl having from one to twelve carbon atoms.

11. 17α - methyl-4,15-estradien-17β-ol-3-one, according to claim 10, wherein R is methyl and R" is hydrogen.

12. 17α-ethynyl-4,15-estradien-17β-ol-3-one, according to claim 10, wherein R is ethynyl and R" is hydrogen.

13. 17α - (2-chloroethynyl)-4,15-estradien-17β-ol-3-one, according to claim 10, wherein R is chloroethynyl and R" is hydrogen.

14. A compound of the formula

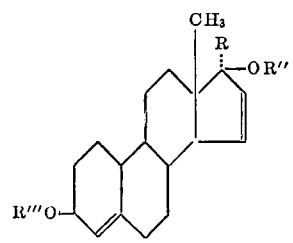

wherein R is hydrogen, lower-alkyl, lower-alkenyl, lower-alkynyl or halo-lower-alkynyl, and R" and R'" are hydrogen or carboxylic acyl having from one to twelve carbon atoms.

15. 3β - acetoxy-17α-methyl-4,15-estradien-17β-ol, according to claim 14, wherein R is methyl, R" is hydrogen and R'" is acetyl.

16. A process for preparing a compound according to claim 14 which comprises treating a compound according to claim 10 with a metal hydride selected from the group consisting of lithium aluminum hydride, lithium tri-t-butoxyaluminum hydride and sodium borohydride.

References Cited

UNITED STATES PATENTS 3,366,652    1/1968    Wendt et al. _____ 260—397.4
3,387,006    6/1968    Wendt et al _____ 260—397.4

ELBERT L. ROBERTS, Primary Examiner

U.S. Cl. X.R.
260—397.5, 999

UNITED STATES PATENT OFFICE
CERTIFICATE OF CORRECTION

Patent No. 3,475,463  Dated October 28, 1969

Inventor(s) Donald K. Phillips

It is certified that error appears in the above-identified patent and that said Letters Patent are hereby corrected as shown below:

Column 2, line 18, "lower 1-alkoxy," should read --lower-alkoxy,--; line 50, "lower-alkenyl, lower-alkenyl or" should read --lower-alkenyl, lower-alkynyl or--.

Column 6, line 5, "71α-" should read --17α- --.

Column 7, lines 56-65, Claim 6, in formula

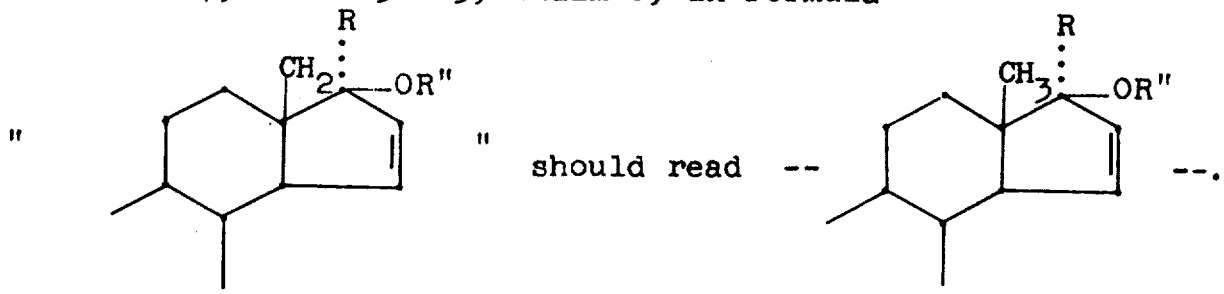

SIGNED AND SEALED
SEP 8 - 1970

(SEAL)
Attest:

Edward M. Fletcher, Jr.
Attesting Officer

WILLIAM E. SCHUYLER, JR.
Commissioner of Patents